US005966192A

United States Patent [19]

Higuchi et al.

[11] Patent Number: 5,966,192

[45] **Date of Patent: *Oct. 12, 1999**

[54] SURFACE LIGHT SOURCE DEVICE AND A LIQUID CRYSTAL DISPLAY

[75] Inventors: Eizaburo Higuchi, Tokyo; Yasuhiro Koike, Yokohama, both of Japan

[73] Assignee: Nitto Jushi Kogyo Kabushiki kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/732,462

[22] PCT Filed: Mar. 7, 1996

[86] PCT No.: PCT/JP96/00561

§ 371 Date: Nov. 4, 1996

§ 102(e) Date: Nov. 4, 1996

[87] PCT Pub. No.: WO96/27817

PCT Pub. Date: Sep. 12, 1996

[30] Foreign Application Priority Data

Mar. 8, 1995 [JP] Japan .................................... 7-074671

[51] Int. Cl.[6] .............................. G02F 1/133; F21V 7/04

[52] U.S. Cl. ................................ 349/61; 349/64; 349/65; 362/31

[58] Field of Search ................................ 349/61, 64, 65; 362/26, 27, 31

[56] References Cited

U.S. PATENT DOCUMENTS

| | | | |
|---|---|---|---|
| 4,642,736 | 2/1987 | Masuzawa et al. | 362/31 |
| 5,046,826 | 9/1991 | Iwamoto et al. | 349/65 |
| 5,303,322 | 4/1994 | Winston et al. | 365/146 |
| 5,414,599 | 5/1995 | Kaneko et al. | 362/31 |
| 5,485,354 | 1/1996 | Ciupke et al. | 362/31 |
| 5,600,455 | 2/1997 | Ishikawa et al. | 349/65 |
| 5,659,410 | 8/1997 | Koike et al. | 362/31 |
| 5,704,703 | 1/1998 | Yamada et al. | 362/27 |

FOREIGN PATENT DOCUMENTS

| | | | |
|---|---|---|---|
| 0 590 511 | 4/1994 | European Pat. Off. . | |
| 5-5882 | 1/1993 | Japan | 349/65 |
| 5-224019 | 9/1993 | Japan . | |
| 2 180 051 | 3/1987 | United Kingdom . | |
| WO 94 29765 | 12/1994 | WIPO . | |

*Primary Examiner*—William L. Sikes
*Assistant Examiner*—Toan Ton
*Attorney, Agent, or Firm*—Staas & Halsey

[57] ABSTRACT

Provided are a surface light source device whose bright surface is excellent in whiteness and softness and a liquid crystal display that ensures a high visual quality. A relatively thick side end surface of a light scattering guide 1, which has a wedge-shaped profile, forms an incidence surface 2. A fluorescent lamp L is located in the vicinity of the incidence surface 2, and a silver foil R is arranged around it. A prism sheet 4 is located outside an exit surface 5. The orientation of the prism sheet 4 is selected so that the running direction of prismatic rows is in line with the transverse direction of the light scattering guide 1. The prismatic surface may be directed inward or outward. A prism sheet 8 is interposed between a back surface 6 of the light scattering guide 1 and a reflector (silver foil) 3. The prism sheet 8 is arranged so that its prismatic surface is directed inward. The orientation of prismatic rows formed on the prismatic surface is selected so that the running direction of the prismatic rows is in line with the vertical direction of the light scattering guide 1.

9 Claims, 8 Drawing Sheets

4f
4e
4
φ3
n2
4b
4a
AR
φ2
5
n0
1
n1
φ1
L'
B1

4f
4c
4d
φ4
4
n2
AR
5
φ2
n0
4e
1
n1
φ1
L'
B2

SURFACE LIGHT SOURCE DEVICE AND A LIQUID CRYSTAL DISPLAY

SPECIFICATION

1. Technical Field

The present invention relates to a surface light source device and a liquid crystal display, and more specifically, to a surface light source device utilizing an optical element that shows a light scattering effect and a light guiding effect, i.e., “light scattering guide,” and a planar element that has a prismatic effect, i.e., “prism sheet,” and a liquid crystal display using the same for backlighting.

2. Background Art

A surface light source device utilizing a light scattering guide and a prism sheet is proposed and used for backlighting of a liquid crystal display and the like. The prism sheet is formed of a platelike optical material having a surface (i.e., “prismatic surface”) that is formed with V-shaped repetitive corrugated rows.

It is known that the prism sheet functions to modify the propagation direction properties of light fluxes. In the conventional surface light source device, therefore, the prism sheet is located solely on the exit-surface side of the light scattering guide.

FIG. 1 shows an arrangement of the principal part of a conventional surface light source device that employs a prism sheet. Referring to FIG. 1, numeral 1 denotes a light scattering guide having a wedge-shaped profile. The light scattering guide 1 is composed of a matrix of, for example, polymethyl methacrylate (PMMA) and particles uniformly dispersed therein, the particles having a refractive index different from that of the matrix. These particles will be referred to as “particles of different refractive index” hereinafter. A relatively thick end surface of the light scattering guide 1 provides an incidence surface 2. A light source element (e.g., fluorescent lamp) L is located in the vicinity of the incidence surface 2.

A reflector 3 is arranged along one surface (back surface) 6 of the light scattering guide 1. A specular silver foil or diffusive white sheet is used as the reflector 3. An illumination light is emitted from the other surface, i.e., an exit surface 5, of the light scattering guide 1. The prism sheet 4 is located outside the exit surface 5.

For ease of illustration, the distance between the light scattering guide 1 and the prism sheet 4 and the pitch of prismatic rows are exaggerated. One surface of the prism sheet 4 is composed of V-shaped prismatic surfaces **4*a* and 4*b*, while the other surface is a flat surface (bright surface) 4*e* from which an illumination flux 4*f* is emitted. The liquid crystal display is constructed by locating a conventional liquid crystal display device (i.e., “liquid crystal display panel”) outside the prism sheet 4**.

Since the thickness of the light scattering guide 1 is reduced with distance from the incidence surface 2, reflection repeatedly occurs between the exit surface 5 and the slanting back surface 6 in the light scattering guide 1. In consequence, a uniform high luminance can be obtained.

The light introduced from the light source element L into the light scattering guide 1 is subjected to scattering and reflecting actions as it is guided toward a relatively thin end surface 7. In this process, light emission from the exit surface 5 occurs gradually.

The light emitted from the exit surface 5 is provided with directivity and parallelized, depending on the diameter (correlation distance of a nonuniform-refraction structure, in general) of the particles of different refractive index dispersed in the light scattering guide 1. In other words, the illumination light taken out of the exit surface 5 has a tendency to propagate preferentially in a specific direction.

The greater the diameter of the particles of different refractive index (the greater the correlation distance of the nonuniform-refraction structure, in general), the more positively the light emitted from the exit surface 5 is parallelized. Usually, the preferential propagation direction (main propagation direction of the illumination flux) is raised at an angle of about 25° to 30° to the exit surface as viewed from the side of the incidence surface 2.

Thus, the function of the prism sheet 4 employed in the surface light source device shown in FIG. 1 can be described in the following manner.

FIG. 2 is a diagram for illustrating the behavior of the light in a vertical section, in the arrangement shown in FIG. 1. Here “vertical” means “perpendicular to the incidence surface 2.” On the other hand, “parallel to the incidence surface 2” is expressed as “transverse.”

As shown in FIG. 2, the prism sheet 4 is located along the exit surface 5 of the light scattering guide 1, with its prismatic surface inward. A preferred value of the vertical angle of each prism formed on the prismatic surface is $\phi 3$=about 60°.

The direction of incidence is indicated by arrow L'. The preferential propagation direction of the light flux emitted from the exit surface 5 is at an angle of $\phi 2$=about 60° to a line normal to the exit surface 5. If the refractive index of the light scattering guide 1 is 1.492 (PMMA matrix), the angle of incidence upon the exit surface 5 that gives $\phi 2$=about 60° is $\phi 1$=about 35°. A light beam corresponding to the preferential propagation direction is called a “representative beam” and designated by symbol B1.

After the representative beam B1 emitted from the exit surface 5 advances straight through an air layer AR (refractive index n0=1.0), it impinges on the prismatic surface **4*a* of the prism sheet 4 substantially at right angles thereto ($\phi 3$=about 60°). It is to be noted that the percentage for the incidence upon the prismatic surface 4*b*** on the opposite side is relatively small.

The representative beam B1 advances substantially straight to the prismatic surface **4*b* on the opposite side through the prism sheet 4, and is reflected specularly. The reflected beam is projected on the flat surface 4*e* of the prism sheet 4 substantially at right angles thereto, and is emitted from the prism sheet 4. Through this process, the preferential propagation direction, a modified direction substantially perpendicular to the exit surface 5**, is established.

However, the modified preferential propagation direction is not always perpendicular to the exit surface 5. In other words, a considerable angle adjustment is allowed depending on the material (refractive index) of the prism sheet 4, the prism vertical angle 3, and the material (refractive index) of the light scattering guide 1.

FIG. 3 shows another conventional prism sheet arrangement. In this arrangement, the prismatic surfaces of the prism sheet 4 face outward. A preferred prism vertical angle is $\phi 4$=about 70°. A preferred range of the vertical angle for this arrangement is wider than that for the arrangement of FIG. 2.

The direction of incidence is indicated by arrow L'. As in the case of FIG. 2, a representative beam B2, which represents the preferential propagation direction, is projected on the exit surface 5 at the angle $\phi 1$=about 35°, and is mostly emitted into the air layer AR (refractive index n0=1.0). At this time, the emission angle φ2 is about 60°.

After advancing straight through the air layer AR, the representative beam B2 is projected aslant on the flat surface 4*e* of the prism sheet 4, traces a refractive path, such as the one shown in FIG. 3, and is emitted from a surface 4*c* substantially at right angles to the exit surface 5. Here it is to be noted that the percentage for the emission from the surface 4*d* is relatively small.

Since the path for the light after the incidence upon the flat surface 4*e* changes depending on a refractive index n2 and the prism vertical angle φ4 of the prism sheet 4, an adjustment in the preferential propagation direction is allowed in accordance with these parameters.

The conventional surface light source device described above is advantageous in that its depth is relatively small and that it can generate uniform bright illumination fluxes that propagate in a desired direction.

However, the liquid crystal display that employs the above-described conventional surface light source device for backlighting is unsatisfactory in the macroscopic visual feeling of the bright surface (upper surface of the prism sheet). More specifically, it has not been realized to obtain a bright surface that is fine in texture, soft, glareless, and also white enough.

The following is an explanation of possible causes of this problem. The visual diffusing power given to the light scattering guide 1 of the surface light source device shown in FIG. 1 is not very strong. The wider the bright surface, the weaker the diffusing power that is given to secure uniform brightness is. Thus, a considerable quantity of reflected light from the reflector 3, which is arranged along the back surface of the light scattering guide 1, impinges on the eyes of an observer without being subjected to plenty of diffusive action.

As a result, a specular sheet, such as a silver or aluminum foil, which is used as the reflector 3, gives the observer a visual feeling peculiar to a specular surface. This visual feeling involves, so to speak, "lack of whiteness" and "lack of softness" (i.e., "glare"). This problem on the visual feeling is supposed to be associated compositely with the color temperature and the propagation direction characteristics of the illumination flux, as well as with the light quantity level.

If a diffusive white sheet is used as the reflector 3, the lack of whiteness can be improved in some measure. However, the uniformity of the brightness of the bright surface and the light quantity level lower. Whether the reflector is specular or diffusive, moreover, unevenness (e.g., local wrinkles or irregularity), if any, of the surface of the reflector 3 results in visual unevenness.

SUMMARY OF THE INVENTION

Accordingly, the object of the present invention is to overcome the aforementioned drawbacks of the prior art. The present invention provides a surface light source device, which ensures a high brightness level and whose bright surface gives improved visual sensation (whiteness and softness). Also, the present invention provides a liquid crystal display in which the improved surface light source device is used for backlighting so that its visual quality standard, as well as power saving property, is high.

A surface light source device according to the present invention comprises a light scattering guide, primary light source means for supplying light from at least one side end surface of the light scattering guide, a prism sheet located on the exit surface side of the light scattering guide, a reflector located in the vicinity of the back surface side of the light scattering guide, and at least one prism sheet interposed between the light scattering guide and the reflector. The at least one prism sheet has a prismatic surface that are formed with prismatic rows. The orientation of the prism sheet is selected so that the prismatic surface is directed toward the light scattering guide, and that the running direction of the prismatic rows is in line with the direction of light supply from the primary light source means.

Preferably, the reflector, which is located further outside the prism sheet, is specular.

A liquid crystal display that ensures a high visual quality standard, as well as an excellent power saving property, may be provided if the above surface light source device is applied to backlighting for the liquid crystal display.

The basic and most important feature of the present invention lies in that at least one prism sheet is interposed between the light scattering guide and the reflector.

This feature makes the behavior of light in the vicinity of the back surface of the light scattering guide different from that in the conventional arrangement. That is, in the vicinity of the back surface of the light scattering guide, a considerable quantity of light is guided away from the primary light source means while being confined within the prism sheet. This process of light guidance involves internal reflection and light divergence. In consequence, the diversity of optical paths leading to the eyes of an observer increases, and the visual brightness (i.e., "whiteness") and "softness" are improved remarkably.

DETAILED DESCRIPTION OF THE PREFERRED EMBODIMENTS

Figure 4:
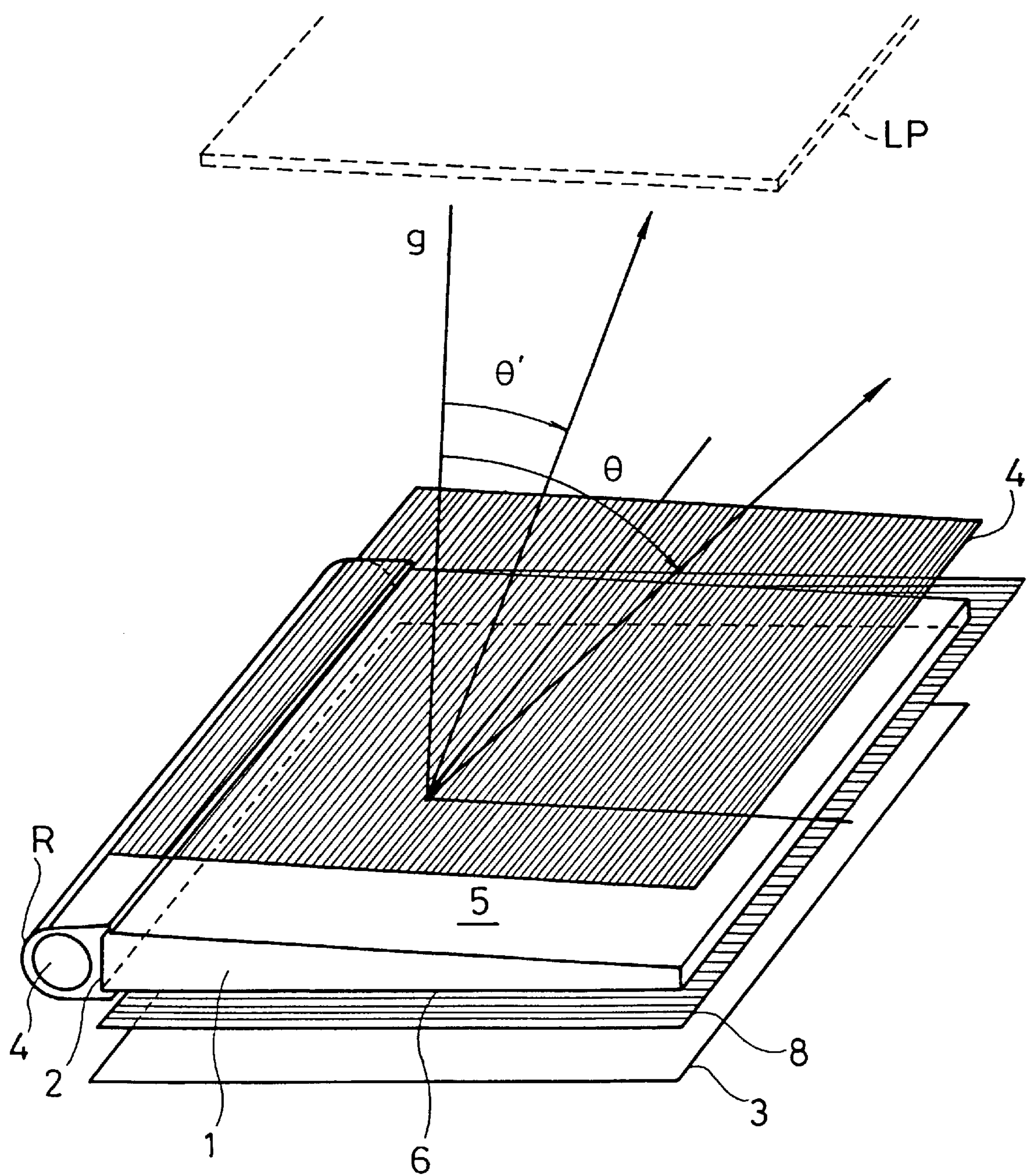
FIG. 4 is a schematic view of an arrangement of an embodiment of the present invention.

FIG. 4 shows an arrangement of the principal part of one embodiment of the present invention. Like numerals are used to designate common elements that are shared with the surface light source device shown in FIG. 1. For ease of illustration, moreover, FIGS. 1 and 4 are reverse to each other in lateral positional relation, and the thicknesses of prism sheets and a reflector are neglected.

Figure 1:
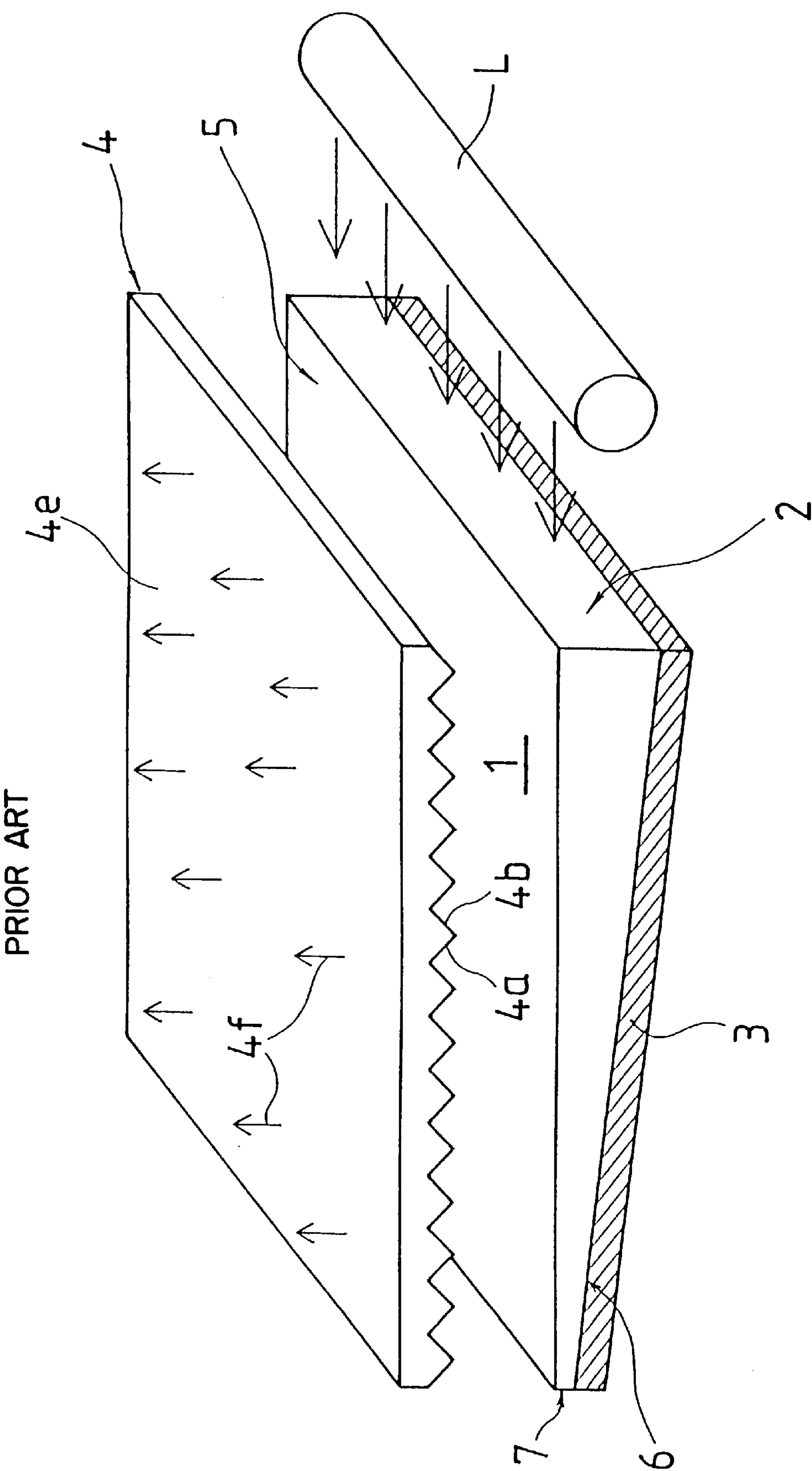
FIG. 1 is a schematic view of an arrangement of a conventional surface light source device that employs a prism sheet.
Figure 2:
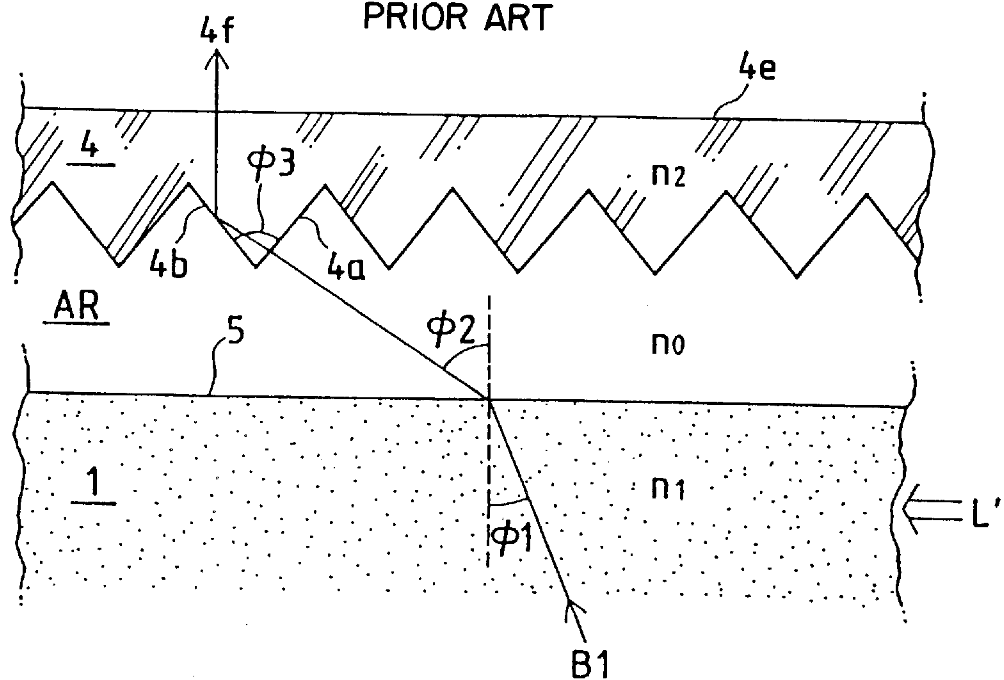
FIG. 2 is a diagram for illustrating the behavior of light in a vertical section, in the arrangement shown in FIG. 1.
Figure 3:
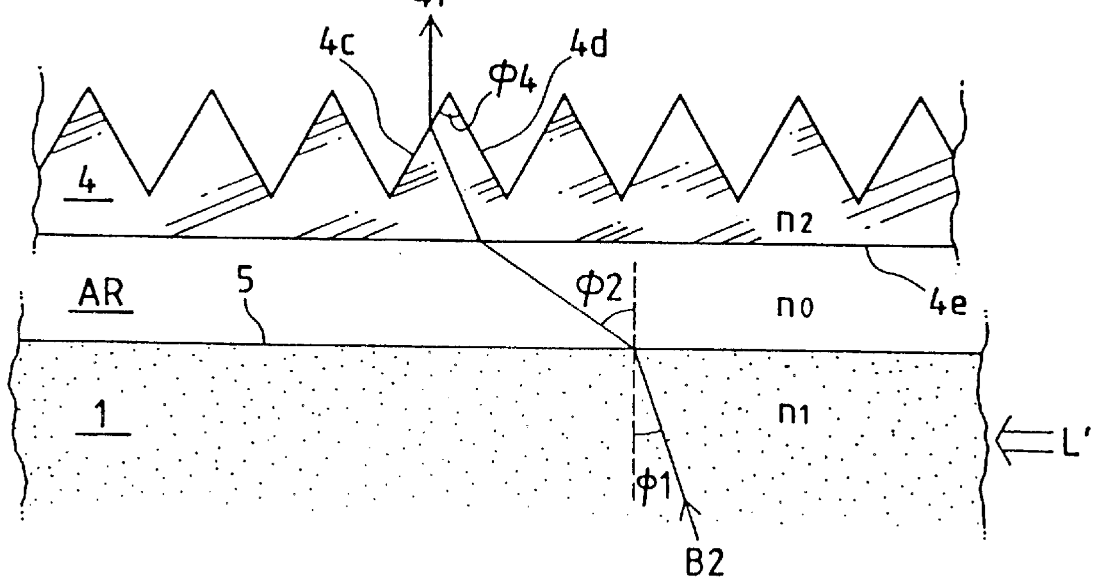
FIG. 3 is a vertical sectional view for illustrating the behavior of light in the same manner as FIG. 2, for the case in which the prismatic surface of the prism sheet shown in FIG. 1 faces outward.

The present embodiment is equivalent to an arrangement that is obtained by adding another prism sheet to the conventional arrangement shown in FIG. 1. More specifically, a relatively thick side end surface of a light scattering guide 1 having a wedge-shaped profile provides an incidence surface 2, and a light source element (e.g., fluorescent lamp) L is located in the vicinity of the incidence surface 2. Symbol R designates a reflector sheet (e.g., silver foil; not shown in FIG. 1), which is provided surrounding the rear side of the light source element (e.g., fluorescent lamp) L.

A prism sheet 4 is located outside an exit surface 5. The running direction of prismatic rows of the prism sheet 4 is in line with the transverse direction of the light scattering guide 1. The prismatic surface may be directed inward (so that the prismatic surface faces the light scattering guide 1) or outward, as in the prior art case.

The light scattering guide 1, like the conventional one, is composed of a matrix of, for example, polymethyl methacrylate (PMMA) and a material of different refractive index (e.g., silicone-based fine particles) are uniformly dispersed therein. The content (wt. %) of the material of different refractive index is adjusted so that the light scattering guide 1 has a suitable diffusing power.

In general, the larger the vertical size of the light scattering guide 1, the lower the content of the material of different refractive index to be selected is. If the light scattering guide 1 is provided with an excessive diffusing power, propagation of light to a portion distant from the incidence surface 2 is hindered, so that the bright surface may possibly be subject to a brightness gradient.

On the other hand, the particle size of the particles of different refractive index is a factor that affects the intensity of forward diffusiveness for individual scattering processes in the light scattering guide 1. In general, the larger the particle size, the higher the forward diffusiveness is. If the particle size is relatively large, the light flux emitted from the exit surface 5 has a distinct directivity, thereby a relatively well parallelized light flux being obtained.

If the particle size is relatively small, in contrast with this, the directivity of the light flux emitted from the exit surface 5 lowers.

It is preferable, therefore, to adjust the particle size in accordance with the level of the directivity required for the illumination flux. According to the present invention, no special restrictions are imposed on such conditions for the composition of the light scattering guide 1 arranged as described above.

The following is a description of an arrangement in the vicinity of a back surface 6 of the light scattering guide 1, which provides an essential feature of the present invention. As in the conventional arrangement, a reflector 3 is provided parallel to the back surface 6 of the light scattering guide 1. However, the arrangement of the present invention basically differs from the conventional arrangement in that a prism sheet 8 is interposed between the back surface 6 and the reflector 3.

The construction of the prism sheet 8 itself may be similar to that of the prism sheet 4 outside the exit surface 5. The prism sheet 8 is arranged so that its prismatic surface is directed inward and faces the light scattering guide 1. The orientation of the prismatic rows formed on the prismatic surface is selected so that the prismatic rows face in the vertical direction of the light scattering guide 1.

Either a specular or a diffusive reflector may be used as the reflector 3. It is advisable, however, to use the former (e.g., silver foil) in order to secure a higher brightness level.

In the prior art, as mentioned before, the visual feeling is subject to a problem if the specular reflector 3 is employed. According to the present invention, however, the specular reflector can be used without creating such a problem.

The surface light source device according to the present embodiment or another embodiment, which will be mentioned later, can be used for backlighting of a liquid crystal display. In this case, a conventional liquid crystal display panel LP (partially indicated by broken line) is located outside the prism sheet 4.

According to the present embodiment, a commercially available fluorescent lamp for backlighting was used as the light source element L (i.e., primary light source means). When it was lit and observed macroscopically from outside the prism sheet 4, a bright surface with satisfactory "softness" and "whiteness" was identified. Visual properties such as "softness" and "whiteness" cannot be easily demonstrated by only the conventional photometry using a luminance meter.

Accordingly, two measurement results will first be described, which indicate that the surface light source device according to the present invention has a capacity to provide a high luminance level. Then, reasons for the remarkable improvement in visual feeling will be described.

Figure 5:
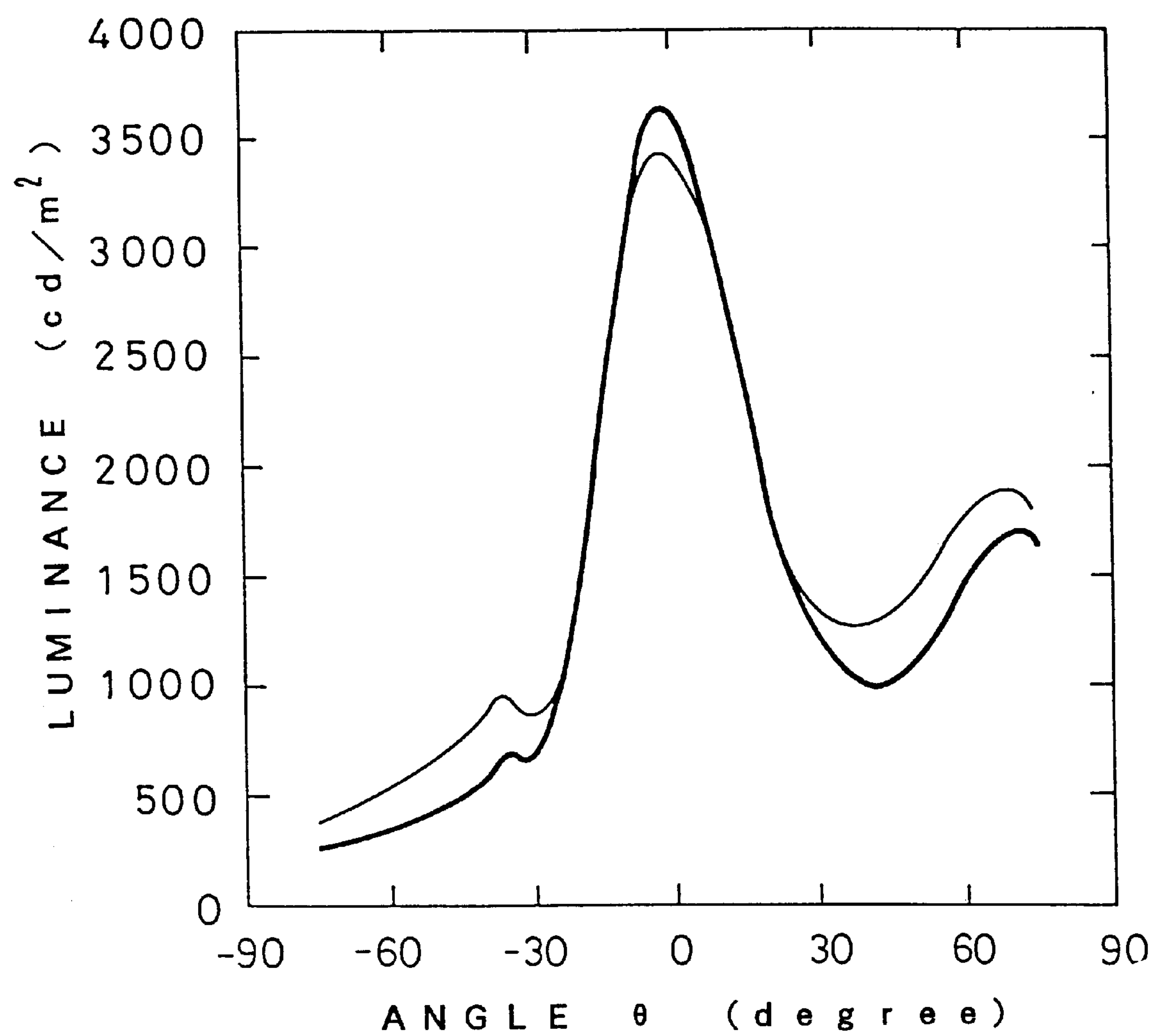
FIG. 5 is a graph for illustrating the difference in luminance of a bright surface depending on the presence or absence of a prism sheet on the back side of a light scattering guide according to the embodiment shown in FIG. 4.
Figure 6:
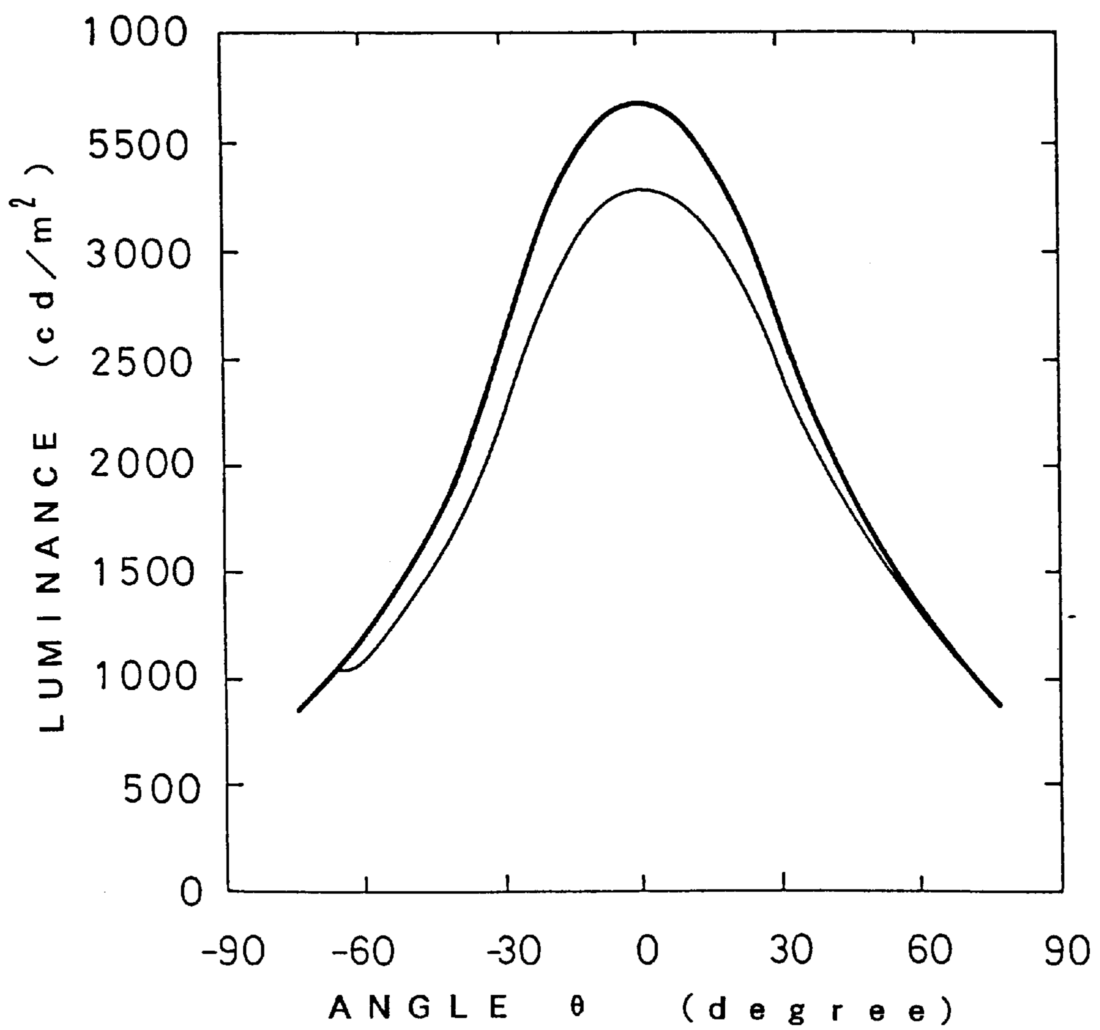
FIG. 6 is another graph for illustrating the difference in luminance of the bright surface depending on the presence or absence of the prism sheet on the back side of the light scattering guide according to the embodiment shown in FIG. 4.

FIGS. 5 and 6 are graphs showing the difference in luminance depending on the presence or absence of the prism sheet 8 according to the embodiment shown in FIG. 4.

In both these graphs, the axis of the ordinate represents the luminance of the bright surface (i.e., outer surface of the prism sheet 4), while the axis of the abscissa represents the direction of luminance measurement (i.e., direction of vision of the luminance meter). The luminance is given in cd (candela)/$m^2$.

Referring to FIG. 5, the direction of luminance measurement was subjected to angular scanning within the vertical section of the light scattering guide 1.

Referring to FIG. 6, on the other hand, the direction of luminance measurement was subjected to angular scanning within the transverse section of the light scattering guide 1. The way of settling scanning angles θ and θ' is shown in FIG. 4.

Specifically, the angle θ represents a forward tilt angle (θ>0°) or backward tilt angle (θ<0°) with respect to a perpendicular g to the bright surface. Also, the angle θ' represents a leftward tilt angle (θ'>0°) or rightward tilt angle (θ<0°) as viewed from the side of the incidence surface 2, with respect to the perpendicular g to the bright surface. The direction of the perpendicular g corresponds to a direction given by θ=θ'=0.

In either graph, a thick line represents a result for the present embodiment, while a thin line represents a result for an arrangement obtained by removing the prism sheet 8 from the present embodiment. The latter is equivalent to the arrangement shown in FIG. 1. These results involve the following facts.

(1) The presence of the prism sheet 8 causes neither of the entire graphs of FIGS. 5 and 6 to get out of shape.

(2) As seen from the graph of FIG. 5, the presence of the prism sheet 8 causes the frontal luminance in the vertical section of the light scattering guide 1 to be improved by about 10%, and restrains light from being emitted in directions at angles of ±30° or more.

(3) As seen from the graph of FIG. 6, the presence of the prism sheet 8 causes the luminance in the transverse section of the light scattering guide 1 to increase as a whole, especially with respect to the frontal direction. The rate of increase of the luminance in the frontal direction is about 10%.

Thus, in the case where the prism sheet is located on the back side of the light scattering guide, the illumination flux can be efficiently radiated in a desired direction (frontal direction in this case) without ruining the general directional property of the conventional surface light source device.

Figure 7:
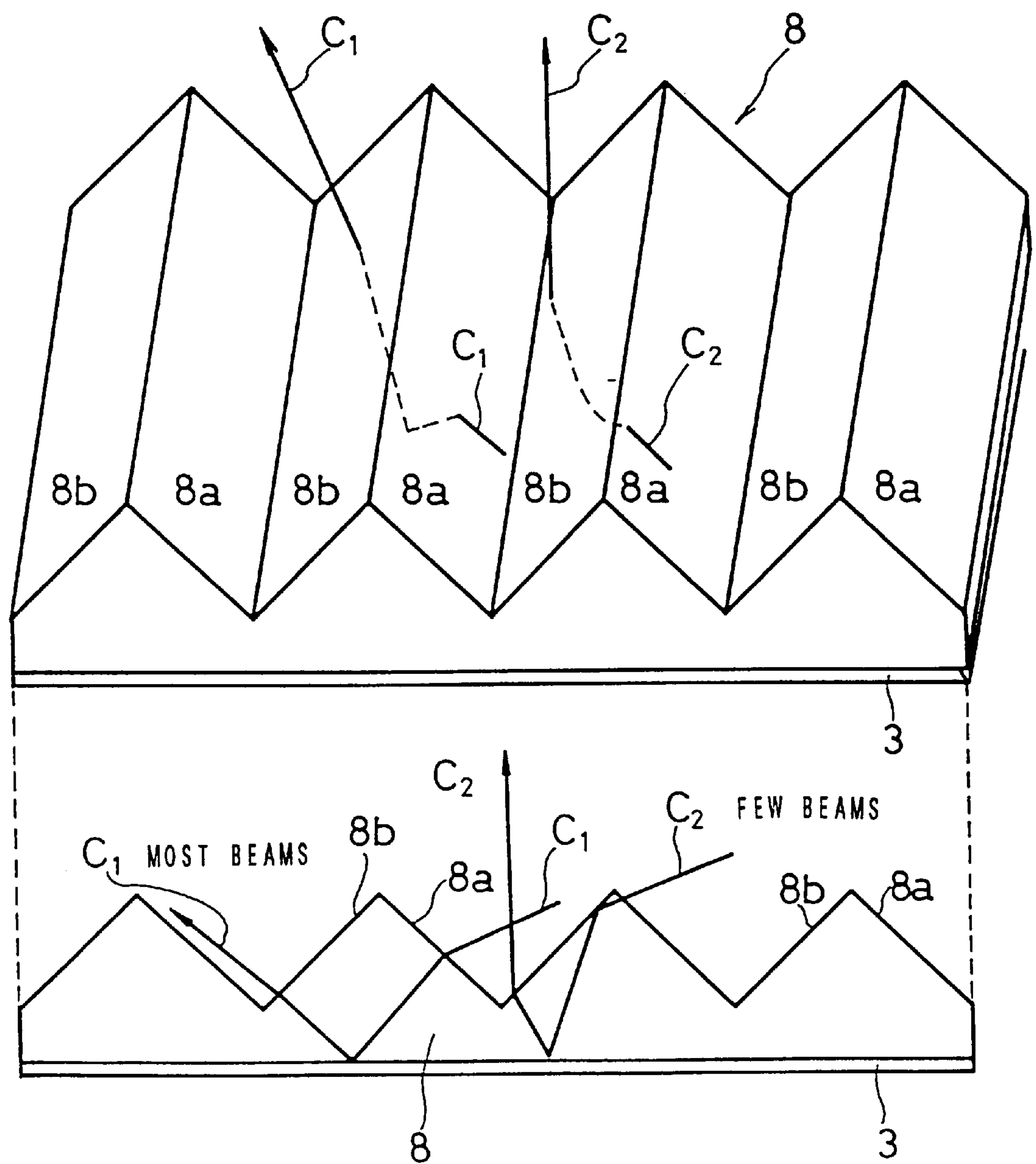
FIG. 7 is an enlarged view of part of the prism sheet located on the back side of the light scattering guide shown in FIG. 4, combining a perspective view and a sectional view taken from the side of a light source element and arranged vertically.

Referring also to FIG. 7, the reason why the visual sensation is considerably improved by the use of the prism sheet 8 will now be described.

FIG. 7 is an enlarged view of part of the prism sheet located on the back side of the light scattering guide shown in FIG. 4, combining a perspective view and a sectional view taken from the side of the light source element and arranged vertically.

As mentioned before, the prism sheet 8 is arranged so that the prismatic surface faces the back surface 6 (not shown in FIG. 7; see FIG. 4) of the light scattering guide 1. A very thin air layer (not shown) exists between the prism sheet 8 and the reflector (silver foil) 3.

The prismatic surface of the prism sheet 8 is formed with prismatic rows that are composed of slanting surfaces *8a* and *8b*. The running direction of the prismatic rows is in line with the vertical direction of the light scattering guide 1. The value of the prism vertical angle is not specially restricted, and may be in a normal angular range (e.g., about 60° to 110°).

Now let us consider the propagation of light from the back surface 6 of the light scattering guide 1 to the prism sheet 8. Most of the light, which is representatively designated by symbol C1, is projected on the one slanting surface *8a* of each prismatic row, and gets into the space inside the prism sheet 8.

Part of the light is reflected (totally reflected, in some cases) by the flat surface of the prism sheet 8, and the remainder by the surface of the silver foil 3. These light components trace substantially the same path, and considerable portions of them get out from the other slanting surfaces *8b* of the prismatic surface into the air layer.

Part of the light, having gotten out into the air layer, is projected into the light scattering guide 1, while the remainder advances again toward the prism sheet 8. The path C1 for this light is not substantially different from the one obtained without the presence of the prism sheet 8.

On the other hand, light represented by a path C2 is projected on the one slanting surface *8a* of each prismatic row, enters the prism sheet 8, and advances toward the other slanting surface *8b*. Most of the light advances toward the flat surface of the prism sheet 8 after being reflected (totally reflected, in many cases). Much of the light temporarily gets out of the prism sheet 8, and is projected again on the prism sheet 8 after being reflected by the surface of the silver foil 3. Then, the light gets out from the other slanting surfaces *8b* of the prismatic surface into the air layer.

Part of the light, having gotten out into the air layer, is projected into the light scattering guide 1, while the remainder advances again toward the prism sheet 8. The path C2 for this light is considerably different from the one obtained without the presence of the prism sheet 8.

Here the presence of the prism sheet 8 implies that regions in which the refractive index is higher than in the ambient air layer are distributed in the vertical direction of the light scattering guide 1. Thus, the prism sheet 8 has a function to guide the light away from the light source element L while confining therein the light having got out of the back surface 6 of the light scattering guide 1.

Since the light confined within the prism sheet 8 is repeatedly reflected therein, there is a general effect to make the advancing direction of the light diverge. As may be also inferred from the consideration for the paths C1 and C2, however, this effect, unlike a general disorderly light diffusion effect, maintains a definite directivity.

Accordingly, the capacity to guide the light to a region distant from the light source element L is rather enhanced. Moreover, a loss attributable to "return light" that is bound for the light source element L cannot be easily caused.

In this manner, the prism sheet 8 causes the light from the back surface 6 to diverge variously while providing a smooth light guiding effect (see divergence of C1 and C2). Thus, the surface of the silver foil 3 can be prevented from direct visual reflection while maintaining the brightness of the illumination flux, so that an observer can perceive "whiteness."

This effect should be understood from the following two results of observation. First, when the silver foil 3 is observed through the prism sheet 4 and the light scattering guide 1 with the light source element L of the surface light source device of FIG. 4 switched off, the silver foil 3 looks white. This indicates that the surface of the silver foil 3 cannot be directly observed in this condition.

When the silver foil 3 is observed through the prism sheet 4 and the light scattering guide 1 with the prism sheet 8 removed from the arrangement of FIG. 4 and with the light source element L switched off, on the other hand, the appearance of the silver foil 3 is reflected as it is, and a color (dark silver) quite different from white color is observed directly.

Although the embodiment shown in FIG. 4 has been described in detail herein, the present invention is not limited to this embodiment. Specifically, two or more prism sheets 8 may be arranged between the reflector 8 and the back surface 6 of the light scattering guide 1.

In this case, the aforementioned orderly light divergence effect is enhanced. Also, the flat surface of the prism sheet 8 may be satinized to have light diffusing power.

The shape of the light scattering guide 1, number and form of the light source elements L, etc. may be also modified variously. FIGS. 8 to 12 are brief partial sketches enumeratively illustrating examples of the modifications. In connection with these modifications, individual descriptions of the general construction of the surface light source device, arrangements and functions of the individual elements, and the arrangement and orientation of the prism sheets are omitted.

Figure 8:
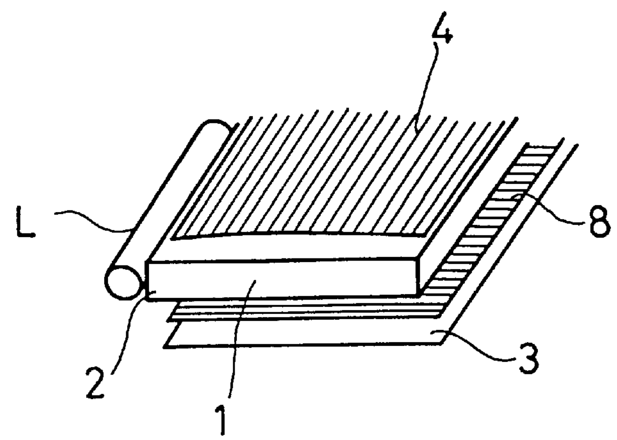
FIGS. 8 to 12 are brief partial schematic views showing various modifications of the present invention.

Referring first to FIG. 8, a planar light scattering guide 1 is employed, and a light source element L is disposed on one side end surface of the guide. This modification differs from the embodiment shown in FIG. 4 only in the profile of the light scattering guide 1.

Figure 9:
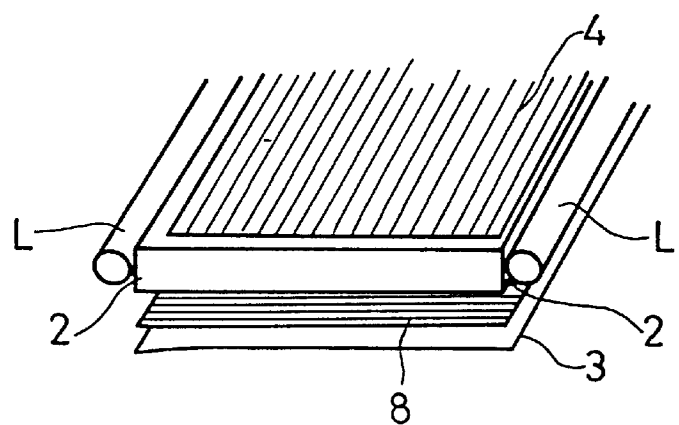

Referring to FIG. 9, a planar light scattering guide 1 is employed, and a light source element L is disposed on each of two opposite side end surfaces of the guide. This modification differs from the embodiment shown in FIG. 4 in the profile of the light scattering guide 1 and in the arrangement and number of the light source elements L used.

Figure 10:
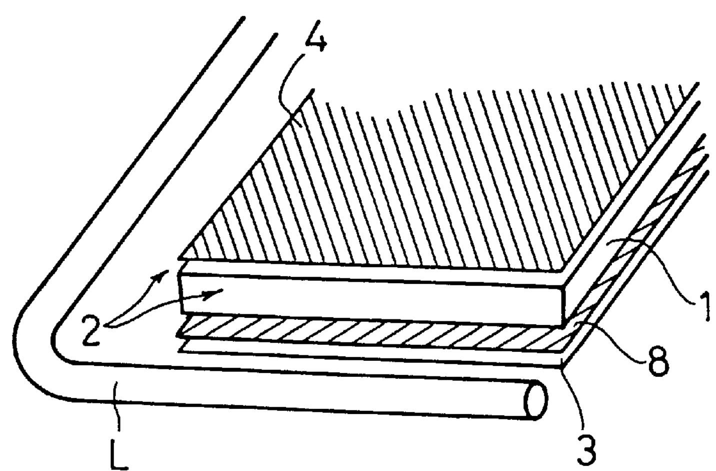

Referring to FIG. 10, a planar light scattering guide 1 and an L-shaped light source element L are employed. In this case, the main direction of light supply is in line with the direction of a diagonal line of the light scattering guide 1. Accordingly, the orientation of the prismatic rows of the prism sheet 8 interposed between the light scattering guide 1 and the reflector 3 is selected so that the rows extend in the direction of a diagonal line that crosses the aforesaid diagonal line.

Figure 11:
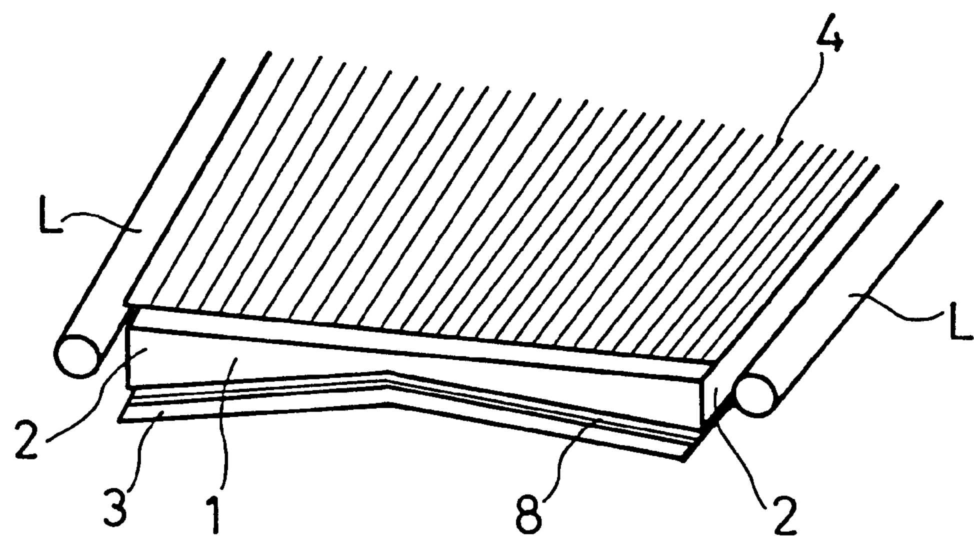

Referring to FIG. 11, an employed light scattering guide 1 has a profile composed of two butting straight wedges. A light source element L is disposed on each end of the guide.

Figure 12:
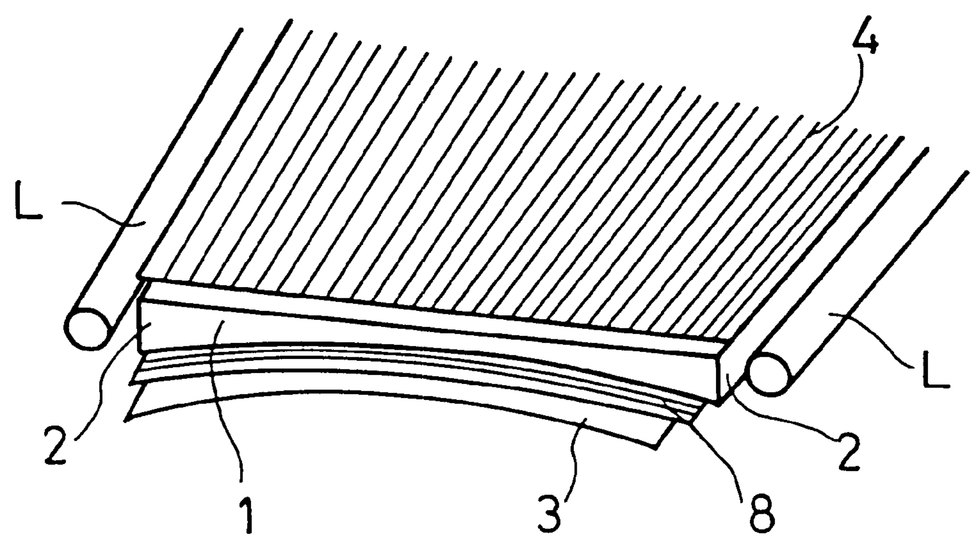

Referring to FIG. 12, the back surface of an employed light scattering guide 1 has the shape of an arch. A light source element L is disposed on each end of the guide.

Finally, a supplementary explanation will be given for the material of the prism sheets and the light scattering guide used according to the present invention and a manufacturing method therefor.

Various materials based on polymers can be employed as the materials of the prism sheets and the light scattering guide. Tables 1 and 2 show typical examples of the materials.

Since a prism sheet is transparent, normally, those materials may be used directly. If the flat surface of the prism sheet is satinized, the conventional blasting method or the like is applicable. Also, the generally-known plastic film forming technique is applicable to the formation of V-grooves that provide a predetermined prism vertical angle.

TABLE 1

| category | name of polymer | refractive index |
|---|---|---|
| MA | 1. PMMA [polymethyl methacrylate] | 1.49 |
| | 2. PEMA [polyethyl methacrylate] | 1.483 |
| | 3. Poly(nPMA) [poly-n-propyl methacrylate] | 1.484 |
| | 4. Poly(nBMA) [poly-n-butyl methacrylate] | 1.483 |
| | 5. Poly(nHMA) [poly-n-hexyl methacrylate] | 1.481 |
| | 6. Poly(iPMA) [polyisopropyl methacrylate] | 1.473 |
| | 7. Poly(iBMA) [polyisobutyl methacrylate] | 1.477 |
| | 8. Poly(tBMA) [poly-t-butyl methacrylate] | 1.463 |
| | 9. PCHMA [polycyclohexyl methacrylate] | 1.507 |
| XMA | 10. PBzMA [polybenzyl methacrylate] | 1.568 |
| | 11. PPhMA [polyphenyl methacrylate] | 1.57 |
| | 12. Poly(1-PhEMA) [poly-1-phenylmethyl methacrylate] | 1.543 |
| | 13. Poly(2-PhEMA) [poly-2-phenylethyl methacrylate] | 1.559 |
| | 14. PFFMA [polyfurfuryl methacrylate] | 1.538 |
| A | 15. PMA [polymethyl acrylate] | 1.4725 |
| | 16. PEA [polyethyl acrylate] | 1.4685 |
| | 17. Poly(nBA) [poly-b-butyl acrylate] | 1.4535 |
| XA | 18. PBzMA [polybenzyl acrylate] | 1.5584 |
| | 19. Poly(2-CIEA) [poly-2-chloroethyl acrylate] | 1.52 |

TABLE 2

| category | name of polymer | refractive index |
|---|---|---|
| AC | 20. PVAc [polyvinyl acetate] | 1.47 |
| XA | 21. PVB [polyvinyl benzoate] | 1.578 |
| | 22. PVAc [polyvinyl phenyl acetate] | 1.567 |
| | 23. PVClAc [polyvinyl chloroacetate] | 1.512 |
| N | 24. PAN [polyacrylonitrile] | 1.52 |
| | 25. Poly(αMAN) [poly-α-methyl acrylonitrile] | 1.52 |

TABLE 2-continued

| category | name of polymer | refractive index |
|---|---|---|
| α-A | 26. PMA(2Cl) [polymethyl-α-chloroacrylate] | 1.5172 |
| St | 27. Poly(o-ClSt) [poly-o-chlorostyrene] | 1.6098 |
| | 28. Poly(p-FSt) [poly-p-fluorostyrene] | 1.566 |
| | 29. Poly(o, p-FSt) [poly-o-, p-diflurostyrene] | 1.475 |
| | 30. Poly(p-iPSt) [poly-p-isopropyl styrene] | 1.554 |
| | 31. PSt [polystyrene] | 1.59 |
| C | 32. PC [polycarbonate] | 1.59 |

A light scattering guide based on a polymeric material can be manufactured by the following methods.

According to one of the methods, a molding process including a stage of kneading two or more polymers. More specifically, two or more polymeric materials having different refractive indexes are mixed, heated, and kneaded together (kneading stage). Although the materials in the kneading stage may be in any desired form, pellet-type materials are available, for example.

The kneaded liquid-like material is injected under high pressure into a mold of an injection molding machine. After being cooled and solidified, it is taken out of the mold, whereupon a light scattering guide having a shape corresponding to that of the mold is obtained.

The two or more polymers having different refractive indexes cannot be fully mixed together by the kneading. In the process of solidification, therefore, unevenness (fluctuation) for the local concentration is fixed, and uniform diffusing power is given.

Moreover, a molded piece of the light scattering guide can be obtained by injecting the kneaded material into a cylinder of an extruding machine and extruding it in the conventional manner.

The combination of and the mixture ratio for these polymer blends can be selected from very wide choices, and must only be settled in consideration of the difference in refractive index and the strength and properties of a nonuniform-refraction structure produced in the molding process. In general, the strength and properties of the nonuniform-refraction structure of a light scattering guide can be described in terms of a scattering irradiation parameter E, correlative distance a, etc.

Typical examples of available polymeric materials are shown in Tables 1 and 2 above.

According to another manufacturing method for the material of the light scattering guide, a particulate material with a refractive index different from that of the polymeric material is uniformly dispersed therein. In general, in this case, a refractive index difference of 0.001 or more is required at the least.

The suspension polymerization method is one of available methods for uniformly dispersing the particulate material in the polymer.

According to the suspension polymerization method, the particulate material is mixed with a monomer, and a polymerization reaction is accomplished in a manner such that it is suspended in hot water, whereupon a polymeric material having the particulate material uniformly dispersed therein is obtained. The light scattering guide with a desired configuration can be manufactured by molding the polymeric material as a raw material.

A plurality of kinds of materials may be prepared by executing the suspension polymerization for various combinations (combinations of particle concentration, particle diameter, refractive index, etc.) of particulate materials and monomers. A light scattering guide with diverse properties can be manufactured by selectively blending and molding these materials. Also, the particle concentration can be easily controlled by blending polymers that contain no particulate materials.

According to still another method available for uniform dispersion of particulate material, a polymeric material and a particulate material are kneaded. Also in this case, a plurality of kinds of materials may be prepared by kneading and molding (pelletizing) various combinations (combinations of particle concentration, particle diameter, refractive index, etc.) of particulate materials and polymers. A light scattering guide with diverse properties can be manufactured selectively blending and molding these materials.

The aforementioned polymer blending method and the particulate material dispersion method may be combined together. For example, polymers with different refractive indexes may be further loaded with a particulate material as they are blended and kneaded.

Since these manufacturing methods are generally known, a detailed description of them is omitted.

As described herein, the present invention provides a surface light source device, which ensures a high brightness level and whose bright surface gives improved visual sensation ("whiteness" and "softness").

Also, there is provided a liquid crystal display in which the improved surface light source device is applied to backlighting for the liquid crystal display so that its visual quality standard, as well as power saving property, is high.

I claim:

1. A surface light source device comprising:

a light scattering guide;

primary light source means for supplying light from qt least one side end surface of said light scattering guide;

a prism sheet disposed along an exit surface of said light scattering guide;

a reflector disposed alone a back surface of said light scattering guide; and at least one prism sheet interposed between said light scattering guide and said reflector, said at least one prism sheet being arranged so that a prismatic surface thereof, having prismatic rows formed thereon, is directed toward said light scattering guide, and that a running direction of said prismatic rows is in line with the direction of light supply from said primary light source means.

2. A surface light source device comprising:

a light scattering guide;

primary light source means for supplying light from qt least one side end surface of said light scattering guide;

a prism sheet disposed along an exit surface of said light scattering guide;

a specular reflector disposed along a back surface of said light scattering guide; and at least one prism sheet interposed between said light scattering guide and said specular reflector, said at least one prism sheet being arranged so that a prismatic surface thereof, having prismatic rows formed thereon, is directed toward said light scattering guide, and that a running direction of said prismatic rows is in line with the direction of light supply from said primary light source means.

3. A surface light source device according to claim 1 or 2, wherein said light scattering guide has a wedge-shaped profile, and said primary light source means is located in the vicinity of a relatively thick side end surface of said light scattering guide.

4. A liquid crystal display furnished with a liquid crystal panel and a surface light source device arranged for backlighting, said surface light source device comprising a light scattering guide, primary light source means for supplying light from at least one side end surface of said light scattering guide, a prism sheet disposed along an exit surface of said light scattering guide, a reflector disposed along a back surface of said light scattering guide, and at least one prism sheet interposed between said light scattering guide and said reflector, said at least one prism sheet being arranged so that a prismatic surface thereof, having prismatic rows formed thereon, is directed toward said light scattering guide, and that a running direction of said prismatic rows is in line with the direction of light supply from said primary light source means.

5. A liquid crystal display furnished with a liquid crystal panel and a surface light source device arranged for backlighting, said surface light source device comprising a light scattering guide, primary light source means for supplying light from qt least one side end surface of said light scattering guide, a prism sheet disposed along an exit surface of said light scattering guide, a specular reflector disposed along a back surface of said light scattering guide, and at least one prism sheet interposed between said light scattering guide and said specular reflector, said at least one prism sheet being arranged so that a prismatic surface thereof, having prismatic rows formed thereon, is directed toward said light scattering guide, and that a running direction of said prismatic rows is in line with the direction of light supply from said primary light source means.

6. A liquid crystal display according to claim 4 or 5, wherein said light scattering guide has a wedge-shaped profile, and said primary light source means is located in the vicinity of a relatively thick side end surface of said light scattering guide.

7. A surface light source device consisting of:

a light scattering guide;

a primary light source to supply light from a side end surface of said light scattering guide;

a reflector disposed along a back surface of said light scattering guide; and at least one prism sheet interposed between said light scattering guide and said reflector, wherein said at least one prism sheet is disposed so that a prismatic surface thereof, having prismatic rows formed thereon, is directed toward said light scattering guide, and a running direction of said prismatic rows is aligned with a direction of light supplied from said primary light source.

8. A surface light source device according to claim 7, wherein said reflector is a specular reflector.

9. A liquid crystal display device including a surface light source device according to any one of claims 7–8.

* * * * *